US006121578A

United States Patent [19]
Owens et al.

[11] Patent Number: 6,121,578
[45] Date of Patent: Sep. 19, 2000

[54] WRAP HEATER AND METHOD FOR HEATING FOOD PRODUCT

[75] Inventors: Byron C. Owens; William M. Bostic; Robert Mericle, all of Asheboro, N.C.

[73] Assignee: Vesture Corporation, Asheboro, N.C.

[21] Appl. No.: 09/267,182

[22] Filed: Mar. 12, 1999

Related U.S. Application Data

[60] Provisional application No. 60/078,303, Mar. 17, 1998.

[51] Int. Cl.[7] ........................................... F27D 11/00
[52] U.S. Cl. ........................... 219/387; 219/385; 219/386
[58] Field of Search ..................................... 219/385, 386, 219/387, 523, 528, 530, 544, 462, 457, 521; 224/275, 282

[56] References Cited

U.S. PATENT DOCUMENTS

| | | |
|---|---|---|
| D. 287,921 | 1/1987 | Skamser . |
| 1,439,094 | 12/1922 | Gingras . |
| 1,558,278 | 10/1925 | Phillips . |
| 2,114,396 | 4/1938 | McFarlan et al. . |
| 2,298,299 | 10/1942 | Joy et al. . |
| 2,479,268 | 8/1949 | Sarria . |
| 2,584,302 | 2/1952 | Stein . |
| 2,980,881 | 4/1961 | McKee . |
| 3,017,493 | 1/1962 | Cooke . |
| 3,079,486 | 2/1963 | Winchell . |
| 3,084,241 | 4/1963 | Carrona . |
| 3,202,801 | 8/1965 | Saluri . |
| 3,273,634 | 9/1966 | Snelling . |
| 3,292,628 | 12/1966 | Maxwell et al. . |
| 3,549,861 | 12/1970 | Trachtenberg et al. . |
| 3,596,059 | 7/1971 | Hager, Jr. . |
| 3,665,939 | 5/1972 | Laing . |
| 3,721,803 | 3/1973 | DiStefano ............................... 219/387 |
| 3,739,148 | 6/1973 | Ryckman, Jr. . |
| 3,780,262 | 12/1973 | Rudd . |
| 3,805,018 | 4/1974 | Luong et al. . |
| 4,035,606 | 7/1977 | Browder . |
| 4,134,004 | 1/1979 | Anderson et al. ....................... 219/387 |
| 4,147,921 | 4/1979 | Walter et al. . |

(List continued on next page.)

FOREIGN PATENT DOCUMENTS

| | | |
|---|---|---|
| 0 001 151 A3 | 3/1979 | European Pat. Off. . |
| 0 130 478 | 1/1985 | European Pat. Off. . |
| 57-96978 | 6/1982 | Japan . |
| 62-241287 | 10/1987 | Japan . |
| 2 054 348 | 2/1981 | United Kingdom . |
| 2 160 965 | 1/1986 | United Kingdom . |
| 2 195 015 | 3/1988 | United Kingdom . |
| 2 255 170 | 10/1992 | United Kingdom . |
| 2 272 969 | 6/1994 | United Kingdom . |
| WO 87/06803 | 11/1987 | WIPO . |

OTHER PUBLICATIONS

Ingrid Inc. advertisements for Thermal Bags (6 pages) (Date Unknown).

*Primary Examiner*—Teresa Walberg
*Assistant Examiner*—L. Fastovsky
*Attorney, Agent, or Firm*—Merchant & Gould, P.C.

[57] ABSTRACT

A wrap heater is provided. The wrap heater includes a first heating sleeve and a second heating sleeve. The first heating sleeve includes a first electrically conductive heating grid, a first stiffening layer for providing rigidity, a first thermostat, and a first cover for enclosing the components in the first heating sleeve. The second heating sleeve includes a second electrically conductive heating grid, a second stiffening layer, a thermostat, and a cover enclosing the components of the second heating sleeve. An extension is provided for separating the first heating sleeve and the second heating sleeve. The wrap heater is provided for heating at least two surfaces of a food product. A method for heating food product, such as pizza, is provided.

11 Claims, 3 Drawing Sheets

U.S. PATENT DOCUMENTS

| | | |
|---|---|---|
| 4,198,559 | 4/1980 | Walter et al. . |
| 4,199,021 | 4/1980 | Thoma . |
| 4,201,218 | 5/1980 | Feldman et al. . |
| 4,335,725 | 6/1982 | Geldmacher . |
| 4,528,439 | 7/1985 | Marney, Jr. et al. . |
| 4,561,441 | 12/1985 | Kolodziej . |
| 4,578,814 | 3/1986 | Skamser . |
| 4,672,178 | 6/1987 | Wada et al. . |
| 4,702,235 | 10/1987 | Hong . |
| 4,743,726 | 5/1988 | Hughes et al. . |
| 4,777,346 | 10/1988 | Swanton, Jr. . |
| 4,802,233 | 1/1989 | Skamser . |
| 4,806,736 | 2/1989 | Schirico ............... 219/386 |
| 4,816,646 | 3/1989 | Solomon et al. ........ 219/387 |
| 4,817,704 | 4/1989 | Yamashita . |
| 4,868,898 | 9/1989 | Seto . |
| 4,894,931 | 1/1990 | Senee et al. . |
| 4,904,846 | 2/1990 | Oscadal . |
| 4,916,290 | 4/1990 | Hawkins . |
| 4,920,964 | 5/1990 | Francis, Jr. . |
| 4,929,094 | 5/1990 | Becker . |
| 4,933,534 | 6/1990 | Cunnigham et al. ........ 219/387 |
| 4,979,923 | 12/1990 | Tanaka . |
| 4,983,798 | 1/1991 | Eckler et al. . |
| 5,009,228 | 4/1991 | Clark . |
| 5,050,595 | 9/1991 | Krafft . |
| 5,052,369 | 10/1991 | Johnson . |
| 5,062,414 | 11/1991 | Grim . |
| 5,078,050 | 1/1992 | Smith . |
| 5,128,522 | 7/1992 | Markx et al. ............ 219/385 |
| 5,150,707 | 9/1992 | Anderson . |
| 5,151,578 | 9/1992 | Phillips . |
| 5,159,177 | 10/1992 | Kinberger . |
| 5,184,725 | 2/1993 | Reinheimer et al. . |
| 5,211,949 | 5/1993 | Salyer . |
| 5,300,105 | 4/1994 | Owens . |
| 5,314,005 | 5/1994 | Dobry . |
| 5,329,096 | 7/1994 | Suematsu . |
| 5,336,255 | 8/1994 | Kanare et al. . |
| 5,339,541 | 8/1994 | Owens . |
| 5,357,693 | 10/1994 | Owens . |
| 5,404,808 | 4/1995 | Smith et al. . |
| 5,405,671 | 4/1995 | Kamin et al. . |
| 5,424,519 | 6/1995 | Salee . |
| 5,454,471 | 10/1995 | Norvell . |
| 5,470,002 | 11/1995 | DiStefano et al. ........ 224/275 |
| 5,551,615 | 9/1996 | Mcintosh . |
| 5,750,962 | 5/1998 | Hyatt ................. 219/528 |
| 5,880,435 | 3/1989 | Bostic ................. 219/387 |
| 5,884,006 | 3/1999 | Frohlich et al. . |
| 5,892,202 | 4/1999 | Baldwin et al. ........ 219/387 |
| 5,932,129 | 8/1999 | Hyatt . |
| 5,999,699 | 12/1999 | Hyatt . |
| 6,018,143 | 1/2000 | Check . |

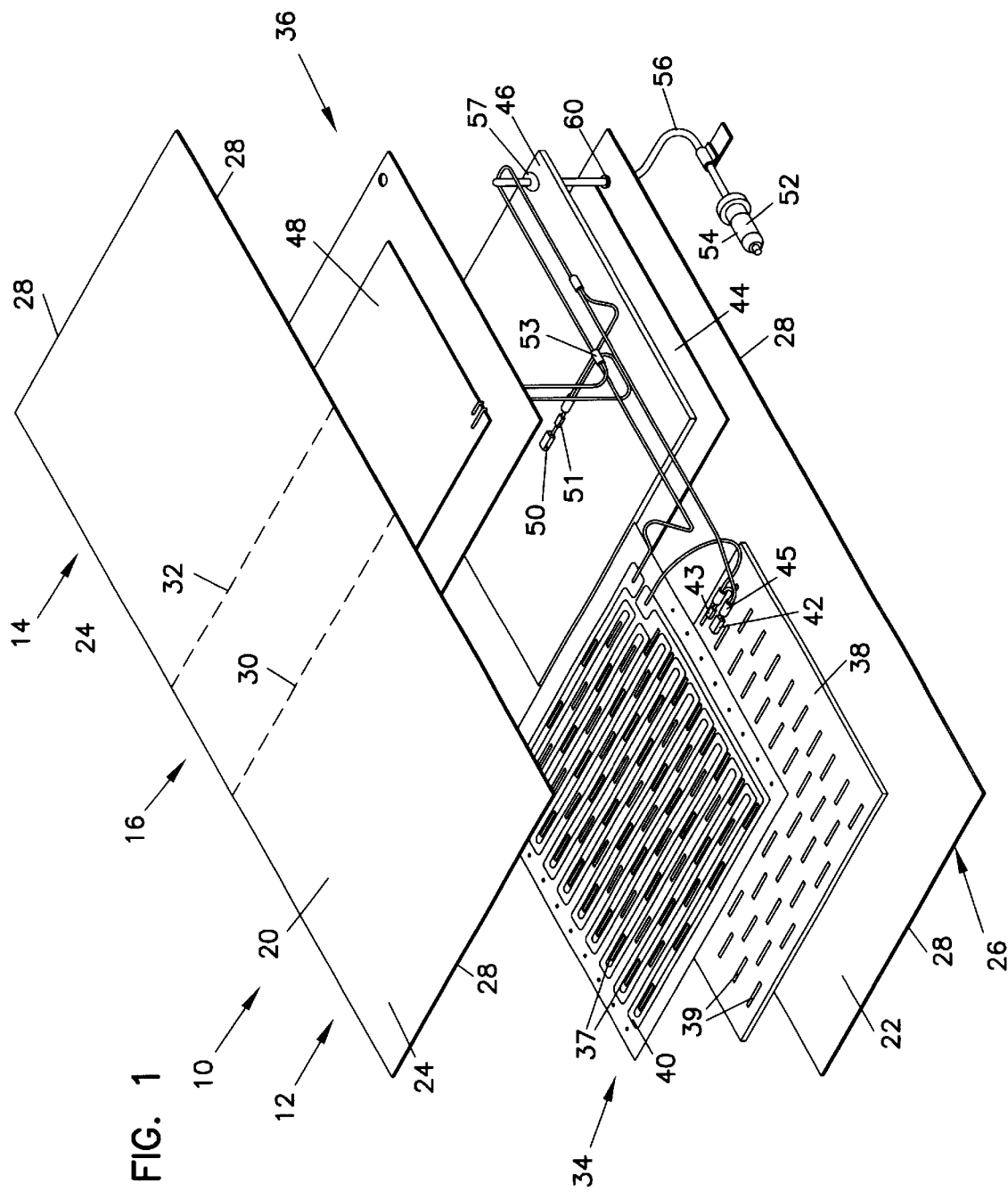

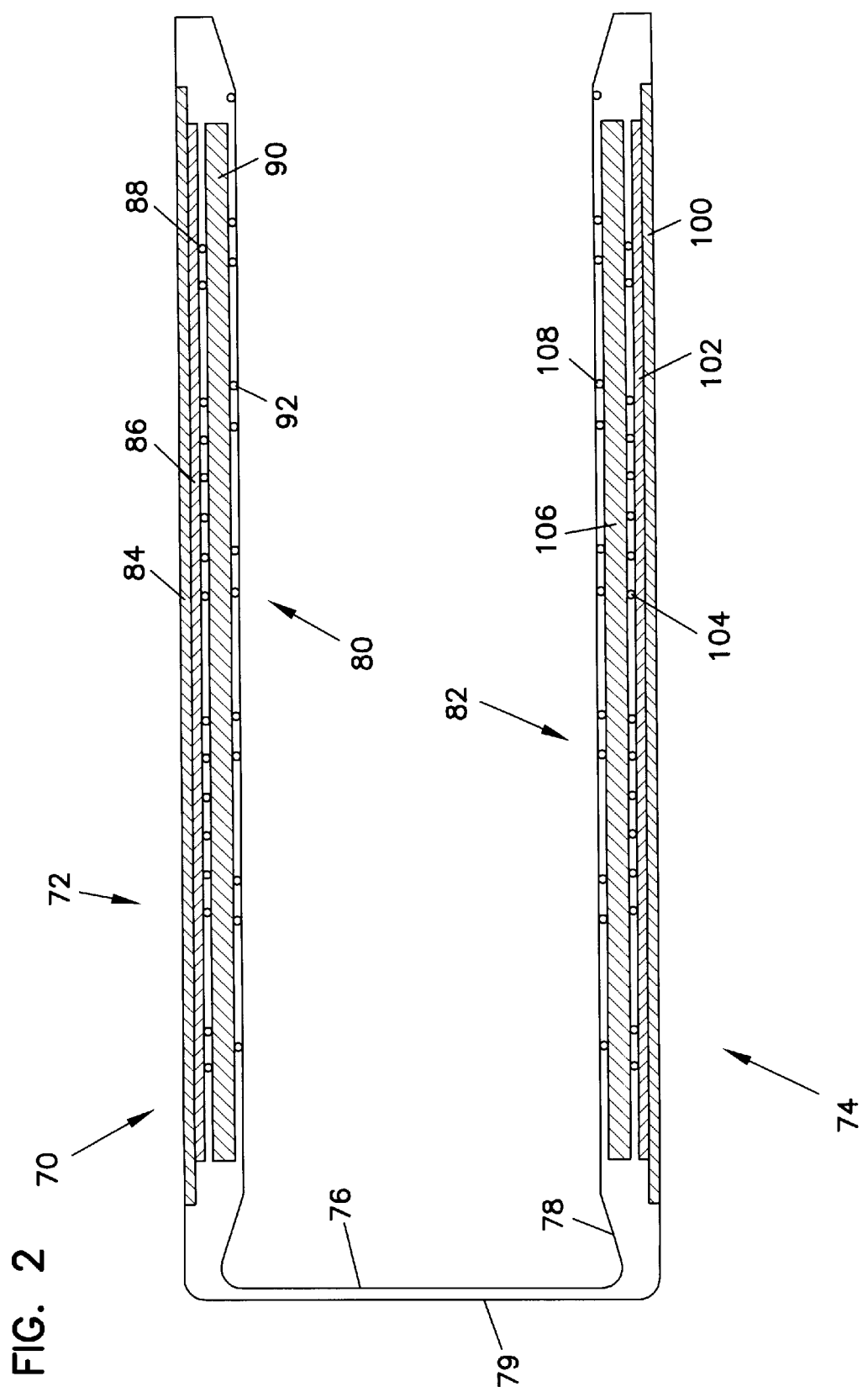

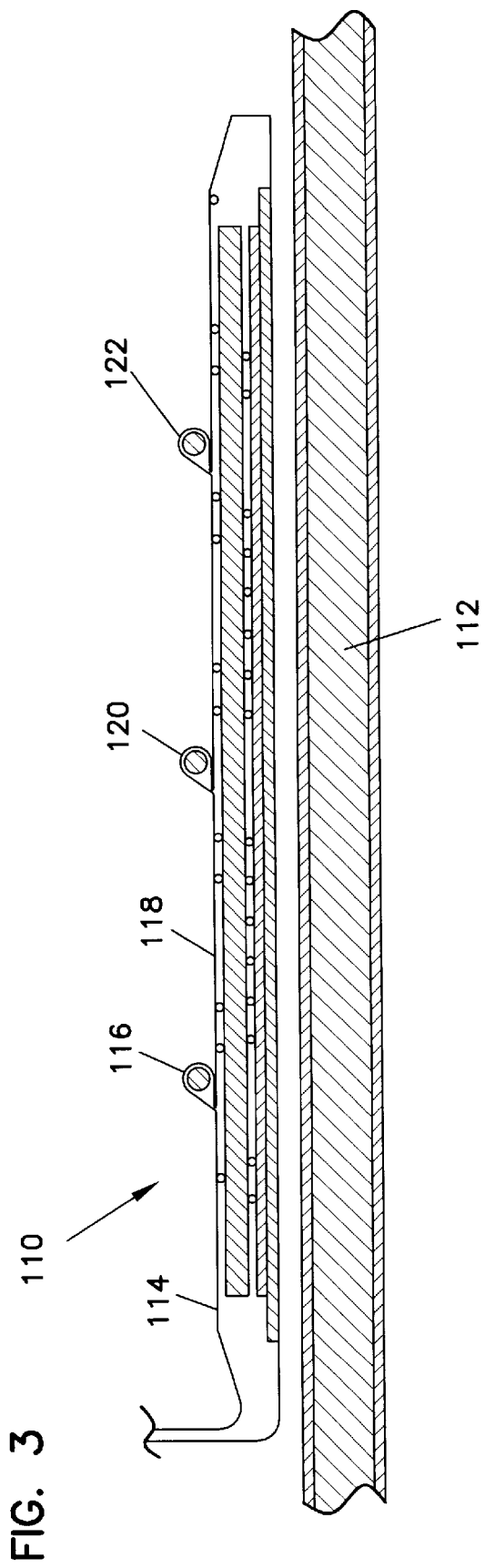

WRAP HEATER AND METHOD FOR HEATING FOOD PRODUCT

CROSS-REFERENCE TO RELATED APPLICATIONS

This application claims priority to U.S. Provisional Patent application Serial No. 60/078,303 which was filed with the United States Patent and Trademark office on Mar. 17, 1998. The entire disclosure of U.S. Provisional Patent application Serial No. 60/078,303 is incorporated herein by reference.

FIELD OF THE INVENTION

This invention relates to a wrap heater for use within a delivery bag, and method for heating food product in a delivery bag. In particular, the delivery bag is a pizza delivery bag and the wrap heater is constructed for being provided within the pizza delivery bag.

BACKGROUND OF THE INVENTION

Food products, such as pizza, are frequently prepared and cooked at a store location. The prepared food product is then delivered to a customer at a home or place of business.

A freshly cooked food product may be stored at the store location awaiting a delivery person's transportation of the food product to the customer. During both the storage and the transportation, the product may lose heat and the temperature of the product may decrease. If the product becomes too cool, it may become unacceptable to a customer. As a result, attention has been directed at techniques for keeping a food product warm after it has been cooked.

In the pizza industry, it is common to prepare a pizza and store it in a cardboard box. The cardboard box is then placed under a heat lamp awaiting pickup by a delivery person. The delivery person then stores the cardboard box in a thermally insulated carrying case for delivery to the consumer.

U.S. Pat. No. 5,750,962 to Hyatt and U.S. Pat. No. 4,816,646 to Solomon et al. describe devices which can be used to keep food items warm during transportation.

SUMMARY OF THE INVENTION

A wrap heater is provided by the present invention. The wrap heater includes a first heating sleeve and a second heating sleeve. The first heating sleeve includes a first electrically conductive heating grid, a first stiffening layer for providing rigidity, a first thermostat provided between the first electrically conductive heating grid and the first stiffening layer, and a first cover. The first cover is provided for enclosing the first electrically conductive heating grid, the first stiffening layer, and the first thermostat. The second heating sleeve includes a second electrically conductive heating grid, a second stiffening layer, a second thermostat provided between said second electrically conductive heating grid and said second stiffening layer, and a second cover. The second cover is provided for enclosing the second conductive heating grid, the second stiffening layer, and the second thermostat. An extension is provided for separating the first heating sleeve and the second heating sleeve. The extension allows the first heating sleeve to contact or provide heating of a first surface of a food product while the second heating sleeve contacts or provides heating of a second surface of a food product. Preferably, the first and second surfaces of a food product are opposed surfaces. In the case of pizza, the first and second surfaces of the pizza which are preferably heated by the first and second heating sleeves are the top and bottom surfaces of the pizza. In the case of stacked pizza, the top surface of the top pizza would be closest to one of the heating sleeves, while the bottom surface of the bottom pizza would be closest to the other heating sleeve. The first and second electrically conductive heating grids are constructed for being placed in electrical communication with a power supply.

A method for heating food product, such a pizza, in a delivery bag is provided by the invention. The method includes steps of providing a wrap heater in a food delivery bag, heating the first electrically conductive heating grid and the second electrically conductive heating grid, and providing food product within the food delivery bag.

A pizza delivery bag is provided by the present invention. The pizza delivery bag includes a wrap heater having a first heating sleeve and a second heating sleeve. The pizza delivery bag is constructed and arranged for holding at least two large size pizzas and for containing the wrap heater so that the first heating sleeve is provided underneath the pizzas and the second heating sleeve covers the pizzas.

BRIEF DESCRIPTION OF THE DRAWINGS

FIG. 1 is an exploded perspective view of the wrap heater according to principles of the present invention;

FIG. 2 is a sectional view of an alternative embodiment of the wrap heater according to principles of the present invention; and FIG. 3 is a partial sectional view of an alternative embodiment of the present invention.

DETAILED DESCRIPTION OF THE PREFERRED EMBODIMENT

With reference now to the various figures in which identical elements are identically numbered throughout, a description of the preferred embodiment of the present invention will now be provided. The present invention will be described with reference to a wrap heater for wrapping and heating food products. In particular, the present invention will be described with reference to a pizza delivery bag for transporting pizzas which are cooked and placed in individual cardboards boxes as is customary. While the invention is being described in the context of a preferred embodiment, it will be appreciated that the invention can be used in a wide variety of applications for storing and/or transporting heated articles where it is desired to maintain the heated articles at an elevated temperature relative to ambient temperature.

Now referring to FIG. 1, a wrap heater 10 is shown having a first heating sleeve 12, a second heating sleeve 14, and an extension 16 provided connecting the first heating sleeve 12 and the second heating sleeve 14. The wrap heater 10 is provided for wrapping an article to provide heating of that article. By "wrapping" it is meant that at least two surfaces of the article are heated. In contrast, prior art heaters tend to provide heating only one surface of the article.

The wrap heater 10 includes an inside cover 20 and an outside cover 22. The inside cover 20 provides a surface 24 which is generally the closest surface of the wrap heater 10 to the article being heated. The outside cover 22 includes a surface 26 which is closest to the container in which the wrap heater 10 is provided. The inside cover 20 and the outside cover 22 are preferably attached together along their edges 28 to contain the internal components and to prevent foreign matter from entering into the internal components of the wrap heater 10. Preferably, the inside cover 20 and the outside cover 22 are sewn together along their edges 28.

The first heating sleeve 12 is separated from the extension 16 by a first crease 30. The second heating sleeve 14 is separated from the extension 16 by a second crease 32. The creases 30 and 32 allow the wrap heater 10 to generally wrap an article for heating. In the case of a pizza provided in a pizza box, the first sleeve 12 can be provided covering the top of the pizza box, and the second heating sleeve 14 can be provided underneath the pizza box. The inside cover 20 and the outside cover 24 are preferably attached along the creases 30 and 32 in order to contain the first sleeve components 34 and the second sleeve components 36 within the first heating sleeve 12 and the second heating sleeve 14, respectively. The inside cover 20 and the outside cover 24 are preferably attached along the creases 30 and 32 by sewing.

The first sleeve components 34 include a first stiffener 38, a first heating grid 40, and a first thermostat 42. Preferably, the first thermostat 42 is provided between the first stiffener 38 and the first heating grid 40. The second sleeve component 36 include a second stiffener 44, an insulating layer 46, a second heating grid 48, and a second thermostat 50. The second thermostat 50 is preferably provided between the insulating layer 46 and the second heating grid 48. It should be appreciated that the first stiffener 38 and/or second stiffener 44 can be omitted if stiffening within the wrap heater 10 is not desired in a particular application. Furthermore, it should be appreciated that the first stiffener 38 and the second stiffener 44 can provide a degree of insulation.

The wrap heater 10 can be designed for handling the humidity generated within a container carrying a heated food item. In the case of a heated pizza, it is often desirable to move moisture through the pizza delivery bag to avoid having the pizza become soggy. In order to increase the flow of humidity through the wrap heater 10, perforations or holes 37 can be provided in the first heating grid 40, and perforations or holes 39 can be provided in the first stiffener 38. Accordingly, the perforations or holes 37 and 39 enhance the flow of humidity therethrough. It should be appreciated, however, that in the case where the inside cover 20 and the outside cover 22 are relatively moisture impermeable, it is not necessary to provide the perforations or holes 37 and 39. Similarly, because the second heating sleeve 14 is generally provided beneath the heated food, airflow and humidity flow therethrough is generally not considered as great of a concern compared with the first heating sleeve 12 which is provided covering the top of the heated food product. When it is desirable to provide humidity flow through the wrap heater 10, it is preferable for the inside cover 20 and the outside cover 22 to be constructed of a material which is permeable to the flow of air and humidity. In general, uncoated materials are preferred for providing for the flow of air and humidity therethrough. In contrast, coated fabrics such as polyurethane coated fabrics can be used when air and humidity flow through the wrap heater is not a particular concern.

The first heating grid 40 and the second heating grid 48 are provided in electrical connection and can be operated by either direct current or alternating current. Preferably, the first and second heating grid 40 and 48 are operated by direct current and include a plug 52 which includes a cigarette adapter 54 for insertion into a cigarette lighter in a motor vehicle. In addition, a cord 56 is provided for electrical conductivity between the plug 52 and the first and second heating grids 40 and 48. It should be appreciated that the plug 52 can be provided for receiving alternating current.

A knot 57 can be provided in the cord 56 to help retain the cord 56 within the inside cover 20 and outside cover 22. As shown, a grommet 60 can be provided in the outside cover 22 as a barrier for passage of the knot 57 therethrough.

It should be appreciated that while a preferred embodiment of the wrap heater includes heating elements in both sleeves, the wrap heater 10 of the invention can be provided so that only one sleeve provides heating. Furthermore, it should be appreciated that the amount of heating provided by both sleeves can vary. That is, the first sleeve can provide greater heating than the second sleeve, or vice versa.

It should be understood that the extension 16 is provided for separating the first heating sleeve 12 and the second heating sleeve 14 so that they may heat different, and preferably opposite, sides of a food article. In addition, the extension 16 is provided for covering wiring which provides electrical connectivity. While the extension 16 is shown as a fabric extension, it should be appreciated that this is not a requirement. That is, the wires could act as the extension separating the first heating sleeve and the second heating sleeve.

Identification of specific components of the wrap heater 10 are provided below. It should be appreciated that while these specific components are identified, they are not the only components that can be used in the wrap heater 10. That is, one skilled in the art would readily appreciate the various components which can be used in place of the specific components identified below. The following description is provided as a preferred embodiment of the invention. The inside cover 20 and outside cover 24 can be 200 denier uncoated fabric. The first stiffener 38 can be perforated foam, and the second stiffener 44 can be a corrugated plastic sheet such as polyethylene. The first heating grid 40 can be a perforated heating grid, and the second heating grid 48 can be a China grid with cover 49. In general, the heating grid 48 can include a pattern laminated metal grid provided within a cover. The insulating layer 46 can be high density foam. The first thermostat 42 can be a 90° C. thermostat, and a thermal fuse 43 can be provided such as a 125° C. thermal fuse. In addition, a splice connector 45 can be provided. The second thermostat 50 can be a 90° C. thermostat. In addition, a thermal fuse 51 and a splice connector 53 can be provided.

The performance of the wrap heater 10 can be adjusted to provide the desired level of heating of a food item during delivery. In the case of pizza delivery, it is generally desirable to provide the pizza with a sauce temperature of about 155° F. at 30 minutes after the pizza is removed from the oven. In order to achieve this, it is generally desirable to provide the heating element with a surface temperature in the range of about 185° F. to about 205° F. in a conventional pizza delivery bag.

An alternative embodiment of the wrap heater according to the invention is provided at reference numeral 70. The wrap heater 70 includes a first heating sleeve 72, a second heating sleeve 74, and an extension 76 provided connecting the first sleeve 72 and the second sleeve 74. Inside cover 78 and outside cover 79 are provided for holding the interior components 80 and 82 in their place and preventing foreign material from causing contamination.

The first heating sleeve 72 includes a stiffener 84, an insulator 86 such as a foam insulation, an alternating current heater 88, a heat storage media 90, and a direct current heater 92. The second heating sleeve 74 includes a stiffener 100, insulation 102, alternating current heater 104, heat storage media 106, and direct current heater 108. It should be appreciated that the heat storage media can include a polymeric material for storage of heat, and can be provided for storage of latent heat. Exemplary heat storage materials include paraffin containing materials, hydrocarbons, and other polymeric materials. A preferred heat storage material includes a polyethylene containing material and, even more preferably, a waxy polyethylene material. Furthermore, it should be understood that it is not necessary for the heat storage media to store latent heat. When the heating sleeves generate heat from direct current, it is often not necessary to include the heat storage media because direct current heating can be accomplished while in the restaurant and while in transit in an automobile. When the energy source is alternating current, it is generally desirable to provide the heat storage media in order to retain heat during the delivery process because many vehicles are not equipped to heat by alternating current. Other materials which can be used include water-containing materials, oils, etc. The heating sleeves may or may not include both direct current heaters and alternating current heaters. Accordingly, it may be desirable to provide only direct current heaters or only alternating current heaters, or a combination thereof.

An alternative embodiment of the invention is provided by the wrap heater 110 shown in FIG. 3. The portion of the wrap heater 110 shown is provided inside a pizza delivery bag 112. The bottom sleeve 114 of the wrap 110 includes risers 116. The risers 116 are provided for elevating the pizza boxes above the top surface 118 of the wrap heater 110. By providing this spacing, enhanced circulation of air within the pizza delivery bag 112 is provided. It is expected that this results in a better oven-like atmosphere within the delivery bag. The risers 116 additionally reduce conductive heat transfer from the top surface 118.

The risers 116 can be provided by sewing rods 120 into the fabric cover 122. It should be appreciated that the spacing can be provided by other techniques.

The above specification, examples and data provide a complete description of the manufacture and use device of the invention. Since many embodiments of the invention can be made without departing from the spirit and scope of the invention, the invention resides in the claims hereinafter appended.

We claim:

1. A wrap heater comprising:
   (a) a first heating sleeve comprising:
      (i) a first electrically conductive heating grid;
      (ii) a first stiffening layer for providing rigidity;
      (iii) a first thermostat; and
      (iv) a first cover for enclosing said first electrically conductive heating grid, said first stiffening layer, and said first thermostat;
   (b) a second heating sleeve comprising:
      (i) a second electrically conductive heating grid;
      (ii) a second stiffening layer;
      (iii) a second thermostat; and
      (iv) a second cover enclosing said second conductive heating grid, said second stiffening layer, and said second thermostat;
   (c) an extension for separating said first heating sleeve and said second heating sleeve;
   (d) said first and second electrically conductive heating grids are constructed for being placed in electrical communication with a power supply; and
   (e) said wrap heater is constructed for being provided within a delivery bag.

2. A wrap heater according to claim 1, further comprising a plug for insertion into an outlet for providing said electrical communication.

3. A wrap heater according to claim 2, wherein said plug is constructed for insertion into a cigarette lighter in an automobile.

4. A wrap heater according to claim 1, further comprising a plug for insertion into an alternating current outlet.

5. A wrap heater according to claim 1, wherein the first electrically conductive heating grid and the second electrically conductive heating grid provide different levels of heating.

6. A method for heating food product in a delivery bag, the method comprising steps of:
   providing a wrap heater in a food delivery bag, the wrap heater comprising
      (a) a first heating sleeve comprising:
         (i) a first electrically conductive heating grid;
         (ii) a first stiffening layer for providing rigidity;
         (iii) a first thermostat; and
         (iv) a first cover for enclosing said first electrically conductive heating grid, said first stiffening layer, and said first thermostat;
      (b) a second heating sleeve comprising:
         (i) a second electrically conductive heating grid;
         (ii) a second stiffening layer;
         (iii) a second thermostat; and
         (iv) a second cover enclosing said second conductive heating grid, said second stiffening layer, and said second thermostat;
      (c) an extension for separating said first heating sleeve and said second heating sleeve;
      (d) said first and second electrically conductive heating grids are constructed for being placed in electrical communication with a power supply; and
      (e) said wrap heater is constructed for being provided within the food delivery bag;
   heating the first electrically conductive heating grid and the second electrically conductive heating grid; and
   providing food product within the food delivery bag.

7. A method for heating food product in a delivery bag according to claim 6, wherein the first heating sleeve and the second heating sleeve heat different surfaces of the food product.

8. A method for heating food product in a delivery bag according to claim 6, wherein the food product comprises pizza.

9. A method for heating food in a delivery bag according to claim 8, further comprising providing the pizza with sauce having a temperature of about 155° F. 30 minutes after removal of the pizza from an oven.

10. A wrap heater according to claim 1, wherein the first thermostat is provided between the first electrically conductive heating grid and the first stiffening layer, and the second thermostat is provided between the second electrically conductive heating grid and the second stiffening layer.

11. A method for heating food product in a delivery bag according to claim 6, wherein the first thermostat is provided between the first electrically conductive heating grid and the first stiffening layer, and the second thermostat is provided between the second electrically conductive heating grid and the second stiffening layer.

* * * * *